United States Patent [19]

Schmitt et al.

[11] 4,324,097
[45] Apr. 13, 1982

[54] NON-RETURN VALVE

[75] Inventors: Wilhelm Schmitt, Heppenheim; Toyotake Taniguchi, Weinheim, both of Fed. Rep. of Germany

[73] Assignee: Firma Carl Freudenberg, Weinheim, Fed. Rep. of Germany

[21] Appl. No.: 212,391

[22] Filed: Dec. 3, 1980

Related U.S. Application Data

[63] Continuation of Ser. No. 6,325, Jan. 24, 1979, abandoned.

[30] Foreign Application Priority Data

Jan. 28, 1978 [DE] Fed. Rep. of Germany ....... 2803778

[51] Int. Cl.³ .............................................. F16K 15/14
[52] U.S. Cl. .................. 60/293; 137/512.15; 137/515.7; 137/859
[58] Field of Search ...................... 137/512.15, 516.11, 137/853, 859, 515.7; 60/319, 293

[56] References Cited

U.S. PATENT DOCUMENTS

| | | | |
|---|---|---|---|
| 2,897,835 | 8/1959 | Philippe | 137/512.15 X |
| 3,176,712 | 4/1965 | Ramsden | 137/515.7 X |
| 3,342,208 | 9/1967 | Steffes | 137/516.11 |
| 3,850,190 | 11/1974 | Carlson | 137/859 |

FOREIGN PATENT DOCUMENTS

| | | | |
|---|---|---|---|
| 2362075 | 6/1974 | Fed. Rep. of Germany | 60/293 |
| 198929 | 6/1923 | United Kingdom | 60/319 |

*Primary Examiner*—William R. Cline
*Attorney, Agent, or Firm*—Sprung, Felfe, Horn, Lynch & Kramer

[57] ABSTRACT

In a one way non-return valve comprising a cylindrical duct, a cone in said duct with its apex pointing in the direction of flow and provided with a plurality of apertures, and a membrane lying on the downstream surface of the cone and clamped at the outer circumference, the membrane having a central aperture, the improvement which comprises employing a cone having an apex angle of about 140° to 160°, the membrane comprising a disk of elastomeric material having a central circular aperture which engages the hollow cone under bias. Advantageously the apertures in the cone are a series of concentrically disposed, round or long-oval apertures, the hollow cone has an apex angle of about 154° and the total area of the apertures in the cone is about twice as great as the area of the aperture in the membrane.

6 Claims, 2 Drawing Figures

NON-RETURN VALVE

This is a continuation of application Ser. No. 6,325, filed Jan. 24, 1979 now abandoned.

The invention relates to a non-return valve which is composed of a cylindrical duct and a hollow cone situated therein having concentrically distributed apertures, whose apex points in the direction of flow and whose surface is in contact with a membrane which is held at the outer circumference and has a centrally disposed aperture.

A non-return valve of this kind is known from U.S. Pat. No. 3,342,208. It serves for the control of the fluid streams flowing into and out of the working chamber of a membrane pump, and it has a hollow cone having numerous concentrically distributed apertures. The surface of this cone is covered by another cone of a soft-elastic material in whose apex a fine aperture is provided. The cone having the soft-elastic properties is completely preformed to match the shape of the supporting cone. The edges of the aperture in the apex come sealingly together in one of two working positions, and in the other they are expanded to a more or less large, elastically yielding aperture. The frequency of operation that can be achieved is therefore limited, and the valve is not suitable for the control especially of gas streams which change direction at a high frequency. Furthermore, for the actuation of the cone having the soft-elastic properties, relatively great mechanical forces are necessary, which cannot be obtained, for example, from a gas stream having a dynamic pressure of less than 3 bars. The control of such gas streams with a non-return valve in accordance with U.S. Pat. No. 3,342,208 is therefore problematical.

THE INVENTION

The object of the invention is to develop a non-return valve for the control of gas flows alternating at high frequencies, which will have an excellent permeability at pressures of less than 3 bars, combined with high non-return reliability, and which furthermore will permit the use of membranes made of high-temperature-resistant elastomers.

BACKGROUND OF THE INVENTION

This object is accomplished in accordance with the invention in a non-return valve of the above-mentioned type wherein the hollow cone has an apex angle between about 140° and 160°, and the membrane is a flat disk of an elastomer, having a central circular aperture resiliently biased against the hollow cone. It has been found to be especially advantageous for the hollow cone to have an apex angle of about 154°.

In a special embodiment, the apertures of the cone have a total area that is about 1.5 to 3 times as large as the area of the aperture in the membrane. It has been found especially advantageous for the total area of the apertures in the cone to be about twice as large as the area of the aperture in the membrane. An excellent operating characteristic is obtained especially when the cone has only one series of concentrically disposed round or long-oval apertures.

The excellent responsiveness of the non-return valve of the invention is based especially on the proposed apex angle of the hollow cone. On the one hand, the proposed angle assures a sufficient primary bias of the basically planar membrane even after long use, resulting in a good sealing action when the pneumatic pressure is applied directly to the face of the membrane. At the same time, due to the relatively low angle bias of the membrane, the membrane effect nevertheless remains effective to a high degree, so that extremely low reaction forces applied to the underside of the membrane will suffice to lift it from the hollow cone. At the same time it is especially important that even a slight lifting of the membrane will result in a large passage cross section. Therefore, no great displacement or deformation of the membrane is needed in order to shift it from the closed to the open state. The actual elasticity of the membrane is therefore not of decisive importance, and instead the possibility is provided in accordance with the invention for selecting from the plurality of usable elastomeric materials those which are best suited for a particular application. In the introduction of fresh air for the detoxification of exhaust gases in the exhaust manifold of an internal combustion engine, it is necessary, for example, to dispose the non-return valve extremely close to the cylinder head in order to make optimum use of the injector effect of the exhaust gases. In these areas very high temperatures are produced. The use of membranes of a silicone rubber has proven excellent in this case.

Another important feature of the non-return valve of the invention is that its design permits a minimization of the mass of the moving parts of the membrane. This results in a simple maximization of the attainable operating frequencies, and levels of 200 hertz are easily achievable.

An embodiment of the non-return valve of the invention is shown in the accompanying drawing wherein.

DETAILED DESCRIPTION OF DRAWINGS

Figure 1:
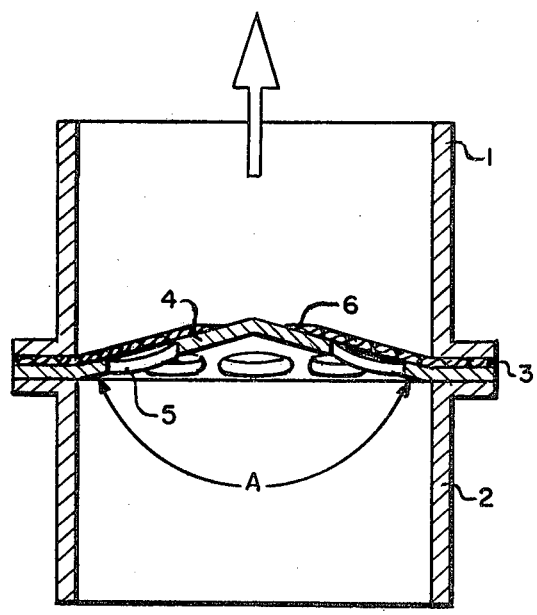
FIG. 1 shows a non-return valve in longitudinal cross section.
Figure 2:
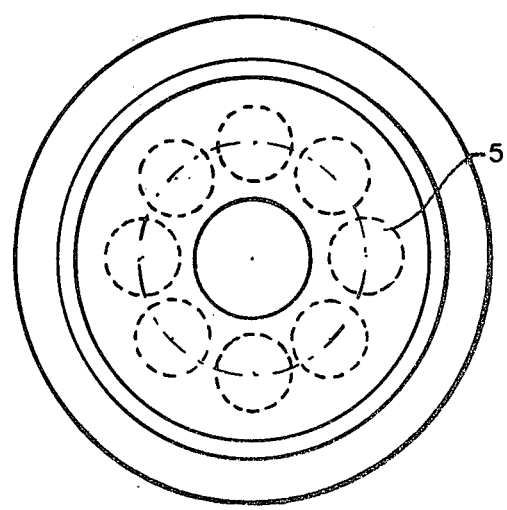
FIG. 2 shows the valve in plan.

Reference characters 1 and 2 indicate the upper and lower parts, respectively, of a duct. Between the two associated flanges of the parts of the duct there is clamped a hollow cone 4 formed of flat sheet metal, which has circular apertures 5 arranged in a concentric circle, and a flat membrane 3 of ring-like construction which has a round aperture 6 in its center. The apex angle of the cone, on which the membrane is placed, is indicated by A.

In a preferred embodiment the inside diameter of parts 1 and 2 is 20 mm. The sheet metal cone 4 is made of steel 0.75 mm thick having an apex angle of 154°. It has eight apertures 5 each 9 mm in diameter with their centers 31 mm from the apex, measured along the conical surface. The membrane 3 is made from a flat disk of FKM.NBA rubber $0.7 \pm 0.15$ mm thick with a central aperture of 19 mm diameter as measured in unstretched flat state.

It will be appreciated that the instant specification and examples are set forth by way of illustration and not limitation, and that various modification and changes may be made without departing from the spirit and scope of the present invention.

What is claimed is:

1. In a combustion and exhaust system of an internal combustion engine, an exhaust manifold for combustion gases and means for supplying fresh air to the exhaust manifold so as to detoxify the exhaust gases, the improvement which comprises including in the exhaust manifold a one way non-return valve comprising a cylindrical duct, a cone in said duct having an apex angle of about 140° to 160° with its apex pointing in the direction of flow and provided with a plurality of apertures, and a membrane lying on the downstream surface of the cone and effectively clamped to the duct at the outer membrane circumference, the membrane comprising a disk of elastomeric material having a central circular aperture and which engages the hollow cone under an inherent elastic bias to completely seal the cone apertures in the closed state, the apertures of the cone having a total area which is about 1.5 to 3 times as large as the area of the aperture in the membrane.

2. A non-return valve according to claim 1, wherein the hollow cone has an apex angle of about 154°.

3. A non-return valve according to claim 1, wherein the total area of the apertures in the cone is about twice as great as the area of the aperture in the membrane.

4. A non-return valve according to claim 1, wherein the apertures in the cone are a series of concentrically disposed, round apertures.

5. A non-return valve according to claim 4, wherein the hollow cone has an apex angle of about 154° and the total area of the apertures in the cone is about twice as great as the area of the aperture in the membrane.

6. A non-return valve according to claim 1, wherein the apertures in the cone are a series of concentrically disposed, long-oval apertures.

* * * * *